Oct. 23, 1951  W. D. WEIKART ET AL  2,572,789
BAND SAW TIRE-MOUNTING DEVICE
Filed Dec. 3, 1947  2 SHEETS—SHEET 1

Inventors
Warren D. Weikart
Edward F. Altomare

By
Attorneys

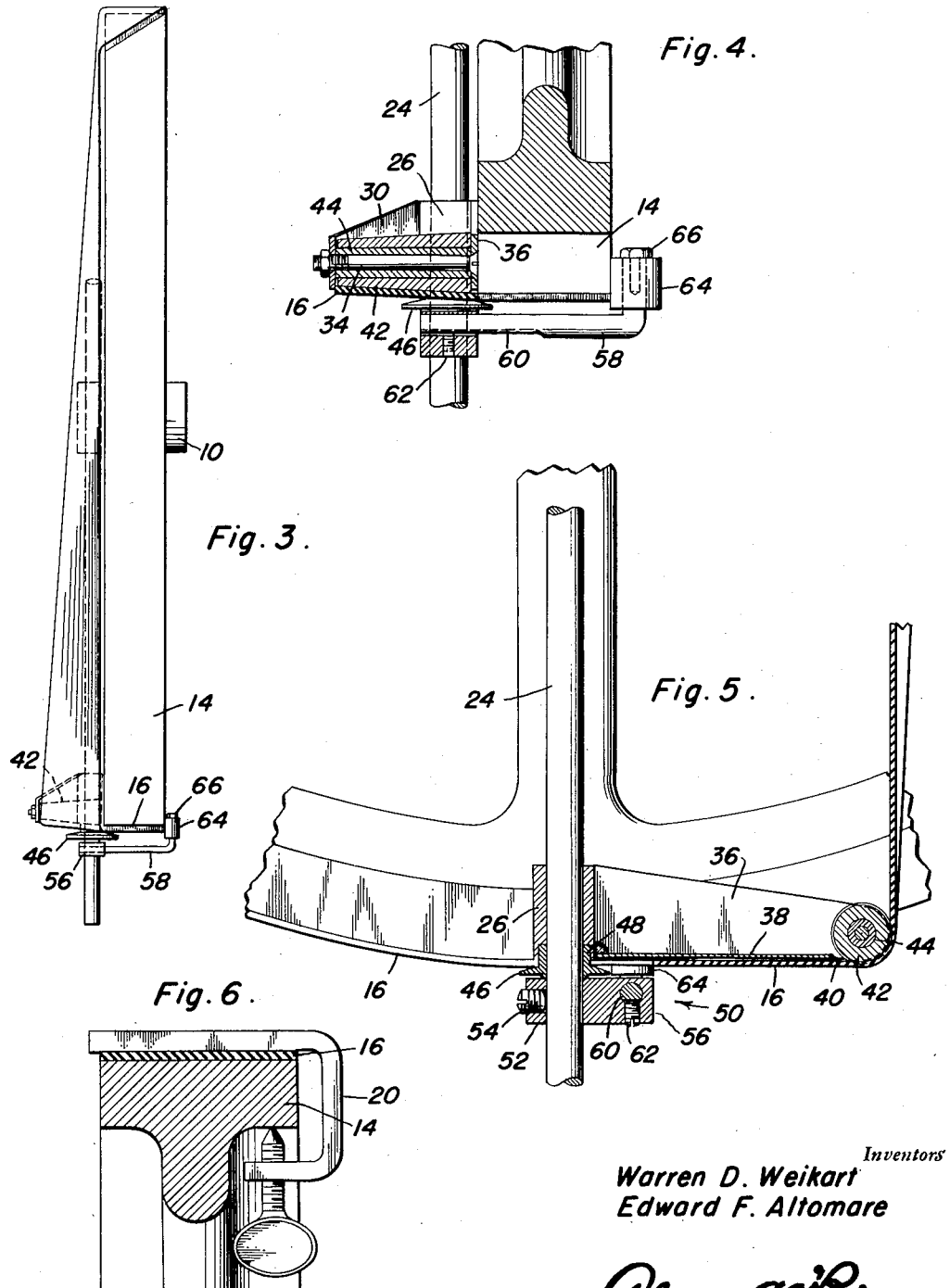

Patented Oct. 23, 1951

2,572,789

UNITED STATES PATENT OFFICE 2,572,789

BAND-SAW TIRE MOUNTING DEVICE

Warren D. Weikart and Edward F. Altomare, Leetonia, Ohio

Application December 3, 1947, Serial No. 789,500

2 Claims. (Cl. 157—1.22)

This invention relates generally to tools, and more particularly to a band saw tire mounting device.

A primary object of this invention is to provide a device whereby a band saw tire may be conveniently mounted upon a band saw driving wheel.

Another object of this invention is to provide means whereby the band saw tire may be clamped to the wheel at one side thereof, so that a portion of the tire may then be manually placed upon the wheel with the tapered roller of this device in engagement with the tire, and with a bar of the device contacting the axle of the wheel, thus allowing cooperation between the axle, a guide roller and the tapered roller in forcing the tire on the wheel; it being understood that the device is manually operated.

Still another object of this invention is to incorporate with such a device a means for mounting the said tapered roller in proper position on the side of the wheel.

Still another object of this invention is to provide a device of this character in which the mounting for the said guide roller is used to hold a third roller in operative relation with the other rollers, this last roller rotating on an axis normal to the axis of rotation of the tapered roller.

Still another object of this invention is to provide a device of this character which is safe to use, inasmuch as means is provided to prevent a device from slipping out of proper operative position when in use.

Still another object of this invention is to provide means which inclines the portion of the tire operated in a proper manner to facilitate the sliding of this portion onto the wheel.

And a last object to be specifically mentioned is to provide a device of this character which is extremely simple to operate and to adjust for use with different sized wheels, which is relatively inexpensive and practicable to manufacture, and which will give generally efficient and durable service.

With these objects definitely in view, this invention resides in certain novel features of construction, combination and arrangement of parts and portions as will be hereinafter described in detail in the specification, particularly pointed out in the appended claims, and illustrated in the accompanying drawings which form a material part of this application, and in which:

Figure 3 is another side elevational view of the same;

Figure 4 is an enlarged detailed fragmentary view in transverse vertical section, taken on the line 4—4 in Figure 1;

Figure 5 is another cross sectional view, taken on the line 5—5 in Figure 2; and, Figure 6 is an enlarged fragmentary detail view showing the clamp as used in securing a portion of the tire on a portion of the wheel removed circumferentially from the tapered roller.

Similar characters of reference designate similar or identical parts and portions throughout the specification and throughout the several views of the drawings.

Figure 1:
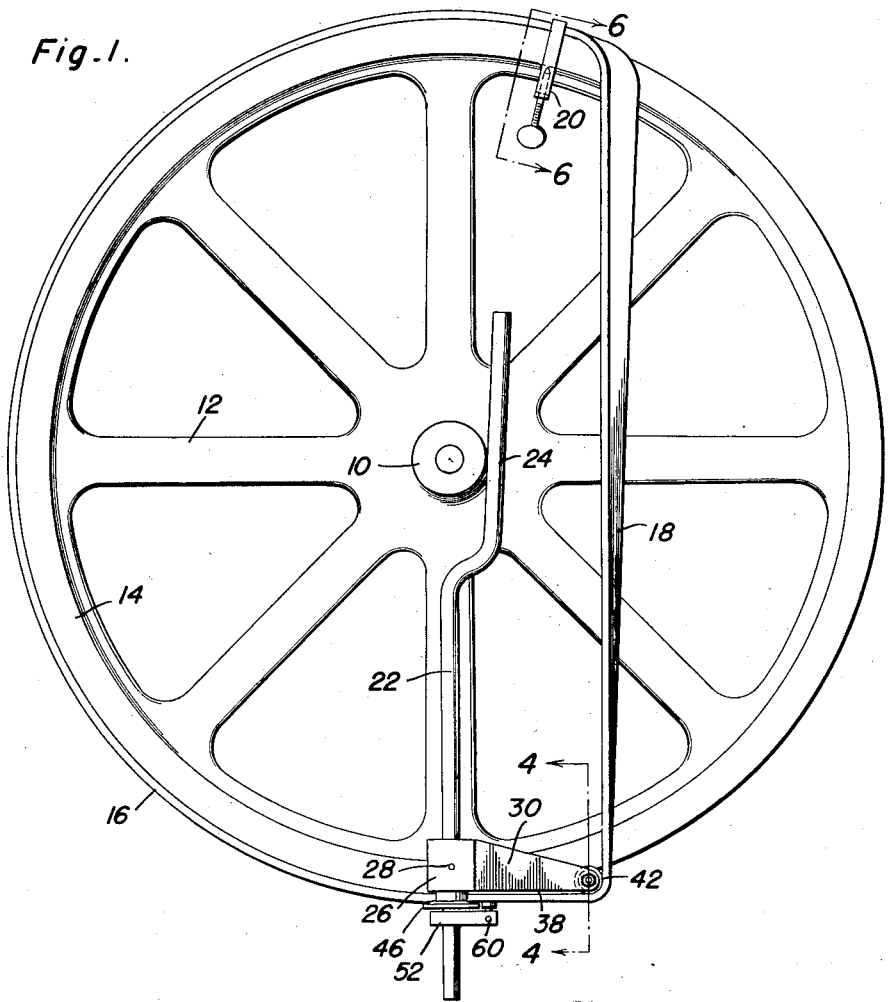
Figure 1 is a side elevational view of a band saw driving wheel, a band saw wheel tire and this invention operatively applied thereto, as in forcing the tire on said wheel.
Figure 2:
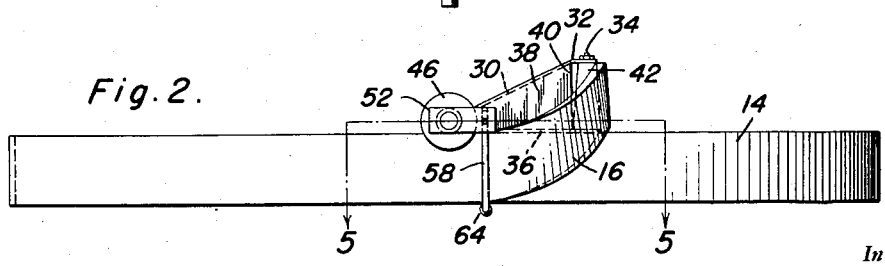
Figure 2 is a lower plan view of the structure illustrated in Figure 1.

Referring to the drawings in detail, the environment wherewith this invention is adapted to be used includes a driving wheel or a band saw having an axle supported hub 10, spokes 12 and a rim portion 14, together with a tire 16. If reference is had to Figure 1, it will be noted that the tire is first placed partially upon the rim 14 with the portion 18 of the tire extending chordally across a portion of the wheel. The tire is prevented from slipping off the wheel at one end of the portion 18 by means of a C-clamp 20 which will be used in an obvious manner as indicated in Figure 1.

The device includes a bar 22 which is shown as constructed from stock of circular cross section, and this bar has an offset portion 24 adapted to engage the wheel axle or hub 10, while the other end of the bar extends beyond the rim 14 of the largest wheel with which it is intended to use the device.

A block 26 is bored to receive the bar 22 and a set screw 28 is used to fasten the block 26 in a predetermined position on the bar 22 adjacent the rim 14 of the wheel. The main portion or sleeve-like portion of the block 26 has secured to one side thereof an extending arm which is U-shaped in cross section vertically and transversely thereof. For the purposes of description, the device will be presumed to be positioned as illustrated in the figures and when in this position the extending arm has a tapered outside wall extending angularly outwardly from the rim 14 and having a terminal portion 32 disposed parallel to said rim and apertured to receive one end of the bolt 34, while another vertical wall 36 extends parallel to and closely adjacent to said rim, this last mentioned wall being also apertured to receive a bolt 34, while the bottom plate 38 is preferably integral with the said vertical walls 30 and 36, and the bottom plate 38 is cut back as at 40, to give clearance to the tapered roller 42. The roller 42 is directly mounted on a sleeve bearing or bushing 44 which is held in place by the bolt 34, as clearly illustrated in Figure 4.

The flanged roller 46 has a shank portion 48 freely rotatably mounted within the suitably recessed outer or lower end of the block 26, and this flanged roller and shank portion are bored to receive the bar 22 which serves as a journal for this flanged roller. The flanged roller is held in place in the block 26 by a member generally indicated by the numeral 50 and comprising a slide bearing portion 52 having a bore to receive the bar 22 and a set screw 54 to lock the member 50 on the said bar, and an extending portion 56 integral with the bearing portion 52 and thus made adjustable longitudinally of the bar 22. The extending portion 56 has an arm 58 having a flattened shank portion 60 insertable within a bore in the said extending portion so that the arm 58 is adjustable in a direction transversely related to the rim of the wheel, and since the wheels will differ in width of rims, this adjustability of the arm 58 is required in order that the device may be used with different sized wheels. A set screw 62 is used to fix the shank portion 60 in the extending portion 56. The outer end of the arm 58 is turned upwardly and comprises a journal for a guide roller 64 which may be held freely rotatably mounted on this journal and it will be understood that the guide roller will engage one side of the rim 14 and is also adapted to prevent the belt tire 16 from being pushed beyond the edge of the rim adjacent to the guide roller. Any simple means such as a headed bolt 66 threaded into the end of the upwardly extending portion of the arm 58 may be used to retain the guide roller 64 in place.

The operation of this invention will be clearly understood from the foregoing description of the mechanical details thereof, taken in connection with the above recitation of the objects sought to be achieved by this invention. In recapitulation, the tire is first placed on the wheel as illustrated in Figure 1, with the C-clamp 20 holding one portion of the tire on the rim and the other portions of this device disposed as indicated. Forcing the outer end of the bar 22 in a counterclockwise direction as in Figure 1, will force the tire onto the rim, the guide roller 64 being adjusted to hold the block and parts carried thereby in frictional engagement with one side of the rim and the tapered roller 42 serving to position the tire at an angle so as to facilitate its sliding onto the rim 14, while the flanged roller 46 completes the operation by pushing the tire into proper position on the rim as the device is moved in a counterclockwise direction.

Obviously, many minor variations may be made in the exact construction and proportionment of the various elements in this invention and the drawings and specification are to be considered as illustrative rather than limited. Accordingly this invention should be limited only by a proper interpretation of the terminology used in the subjoined claims.

Having described the invention, what is claimed as new is:

1. A band saw tire mounting device including a bar, a block on said bar, said bar being of sufficient length to contact an axle of a band saw driving wheel while supporting said block adjacent the rim of said wheel, a tapered roller freely rotatably mounted on said block on an axis at right angles to the plane of said wheel with the larger diameter end adjacent said rim, a tire-engaging flanged roller freely rotatably mounted on said block to rotate on the adjacent portion of said bar, a guide roller carried by said bar and disposed in offset relation thereto to contact a side of said rim opposite to the side thereof adjacent said tapered roller, said flanged roller being coaxial with said bar.

2. A band saw tire mounting device including a bar, a block on said bar, said bar being of sufficient length to contact an axle of a band saw driving wheel while supporting said block adjacent the rim of said wheel, a tapered roller freely rotatably mounted on said block on an axis at right angles to the plane of said wheel with the larger diameter end adjacent said rim, a tire-engaging flanged roller having a shank or hub portion freely rotatably mounted in said block and on an adjacent portion of said bar, a guide roller carried by said bar and disposed in offset relation thereto to contact a side of said rim opposite to the side thereof adjacent said tapered roller, said block being slidably adjustable along said bar.

WARREN D. WEIKART.
EDWARD F. ALTOMARE.

REFERENCES CITED

The following references are of record in the file of this patent:

UNITED STATES PATENTS

| Number | Name | Date |
|---|---|---|
| 616,967 | Prescott | Jan. 3, 1899 |
| 965,076 | Carle | July 19, 1910 |
| 1,215,680 | Mason | Feb. 13, 1917 |
| 1,352,550 | Singleton | Sept. 14, 1920 |

FOREIGN PATENTS

| Number | Country | Date |
|---|---|---|
| 18,301 | Great Britain | Sept. 1, 1908 |